United States Patent [19]

Yamanaka

[11] Patent Number: 5,406,471

[45] Date of Patent: Apr. 11, 1995

[54] AC-TO-DC CONVERTER INCORPORATING A CHOPPER AND CHARGE-PUMP CIRCUIT COMBINATION

[75] Inventor: Yukio Yamanaka, Kadoma, Japan

[73] Assignee: Matsushita Electric Works, Ltd., Osaka, Japan

[21] Appl. No.: 146,333

[22] Filed: Nov. 1, 1993

[30] Foreign Application Priority Data

Nov. 13, 1992 [JP] Japan .................................. 4-303384

[51] Int. Cl.$^6$ ............................................ H02M 7/00
[52] U.S. Cl. ..................... 363/124; 323/222; 323/224; 323/271; 363/62
[58] Field of Search ............. 363/62, 37, 80, 81, 363/89, 124; 323/222, 224, 271

[56] References Cited

U.S. PATENT DOCUMENTS

| | | | |
|---|---|---|---|
| 4,562,527 | 12/1985 | Klamt | 363/89 |
| 5,103,139 | 4/1992 | Nilssen | 315/219 |
| 5,327,070 | 7/1994 | Seki et al. | 323/222 |

FOREIGN PATENT DOCUMENTS

| | | |
|---|---|---|
| 0507339A2 | 10/1992 | European Pat. Off. |
| 3829387A1 | 3/1990 | Germany |
| 63-37584 | 7/1988 | Japan |
| 2237461 | 9/1990 | Japan |

*Primary Examiner*—Steven L. Stephan
*Assistant Examiner*—Y. Jessica Han
*Attorney, Agent, or Firm*—Kenyon & Kenyon

[57] ABSTRACT

An AC-to-DC converter for providing a step-down output DC voltage from an AC voltage source. The converter includes a rectifier connected to the AC voltage source to provide therefrom a rectified DC voltage to a step-up chopper. The chopper includes an inductor and a switching element which is connected in series with the inductor across the rectifier and which is driven to periodically turn on and off so as to store into the inductor an energy from the rectified DC voltage when the switching element is turned on and to release the energy from the inductor through a blocking diode to a charge-pump circuit when the switching element is turned off. The charge-pump circuit is connected to receive the energy released from the inductor as well as from the rectifier to accumulate a first voltage and provides a divided voltage of the first voltage to charge a smoothing capacitor by the divided voltage so as to develop thereat the step-down output DC voltage for driving a load. The converter further includes a switch which is turned on during at least a portion of an ON-period of the switching element in order to connect the smoothing capacitor to the charge-pump circuit for charging the smoothing capacitor by the divided voltage. The switch is turned off during an OFF-period of the switching element in order to disconnect the smoothing capacitor from the chopper.

5 Claims, 6 Drawing Sheets

FIG. 4
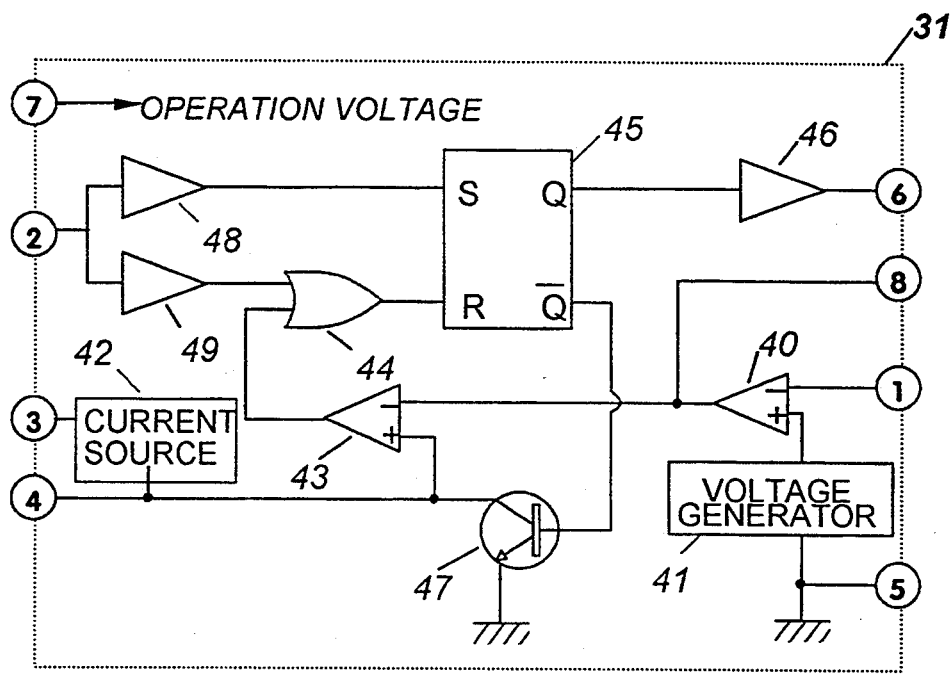
FIG. 5A
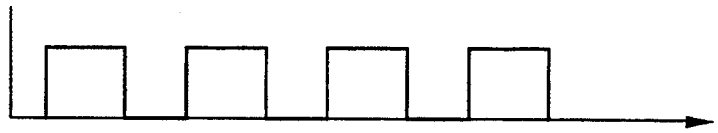
FIG. 5B
FIG. 5C
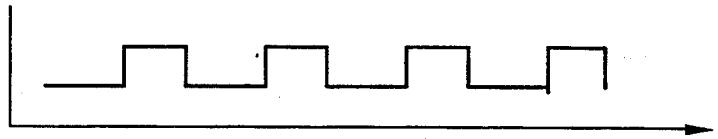
FIG. 5D
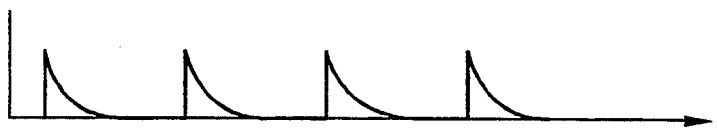
FIG. 5E

AC-TO-DC CONVERTER INCORPORATING A CHOPPER AND CHARGE-PUMP CIRCUIT COMBINATION

BACKGROUND OF THE INVENTION

1. Field of the Invention

The present invention is directed to an AC-to-DC converter for providing a step-down output DC voltage, and more particularly to such a converter including a rectifier and a chopper.

2. Description of the Prior Art

An AC-to-DC converter has been widely utilized in the art, for example, in an electronic ballast where it is combined with an inverter to drive a discharge lamp from an AC voltage source such as an AC mains. In this instance, the AC-to-DC converter is required to supply a smoothed output DC voltage to the inverter in order to operate the discharge lamp efficiently free from flickering. Further, in view of that the output DC voltage should be as smooth as possible in order to eliminate higher frequency harmonics in an input AC current to the converter for reducing corresponding noises as well as to improve the power factor of the converter, the converter is highly desired to include a chopper in addition to a rectifier for providing a smoothed output DC voltage. Consequently, when the converter is designed to provide a step-down DC voltage, it is readily possible to include a step-down chopper or inverted chopper in the converter. However, the choppers of theses types are known to inherently suffer from reduced power factor and are likely to cause undesired higher frequency harmonics which induce noises in other electrical devices powered by the same AC voltage source, in contrast to a step-up chopper which is known to exhibit improved power factor. In order to avoid this problem, it has been proposed to use a step-up chopper in front of the inverted chopper in order to compensate for the reduced power factor of the latter, while assuring to output the step-down DC voltage, as disclosed in Japanese Patent Early Publication (KOKAI) No. 2-237461. As represented in FIG. 1 of the attached drawings, this converter comprises a full-wave rectifier 110 providing a rectified DC voltage from an AC voltage source 100, the step-up chopper 120 and the inverted chopper 150. The step-up chopper 120 includes a first inductor 122 connected in series with a first FET 121 across the rectifier 110, and a first smoothing capacitor 125 connected in series with a first blocking diode 123 across the FET 121. The FET 121 is controlled by a first driver 126 to turn on and off at a high frequency so as to store an energy in the inductor 122 from the rectifier 110 when FET 121 is conductive. Upon subsequent turn-off of FET 121, the inductor 122 releases the energy so that the smoothing capacitor 125 is supplied through the diode 123 with the energy from the inductor 122 as well as from the rectifier 110 to develop a step-up DC voltage. The inverted chopper 150 comprises a second FET 151, a second inductor 152 and a second smoothing capacitor 155 which are connected in series across the first smoothing capacitor 125 with a second diode 153 connected in series with the FET 151 across the first smoothing capacitor 125. The FET 151 is controlled by a second driver 156 to turn on and off at a high frequency so as to store an energy into the inductor 152 when FET 151 is conductive. Upon subsequent turn-off of FET 151, the inductor 152 releases the energy which is alone supplied through the diode 153 into the smoothing capacitor 155 to develop thereat the step-down output DC voltage to an inverter 170 for driving a load. Although the converter can successfully assure improved power factor by the use of the step-up chopper in front of the inverted chopper, there still remains a problem due to the use of the inverted chopper in that all the energy supplied to smoothing capacitor 155 is once stored in the inductor 152, which eventually lowers overall circuit efficiency. Further, the use of the step-up chopper 120 requires the first smoothing capacitor 125 of a high capacitance in order to temporarily store the step-up voltage, in addition to the second smoothing capacitor 155 which may be of a low capacitance for storing the step-down output DC voltage, and also requires the two inductors in the converter, thus causing duplication of expensive components.

Another prior art converter is disclosed in the Japanese Patent Examined Publication (KOKOKU) No. 63-37584 to use a charge-pump circuit instead of the chopper, as represented in FIG. 2 of the attached drawings. The charge-pump circuit 250 is connected to the output of a like full-wave rectifier 210 to receive the voltage therefrom and store the voltage in a series combination of capacitors and 252. A diode network of diodes 254, 256, 258 is connected to the capacitors 251 and 252 so as to form parallel paths through which the individual capacitors 251 and 252 are discharged respectively in parallel relation to supply a step-down DC voltage to an inverter 270. In this manner, this charge-pump circuit 250 can provide the step-down output DC voltage while improving the power factor. However, it is still unsatisfactory in maximizing the power factor and is therefore difficult to eliminate the higher frequency harmonics in an input AC current to the rectifier.

SUMMARY OF THE INVENTION

The above problems have been eliminated in the present invention which provides an improved AC-to-DC converter for providing a step-down output DC voltage. The AC-to-DC converter of the present invention comprises a rectifier connected to the AC voltage source to provide therefrom a rectified DC voltage to a step-up chopper. The chopper includes an inductor and a switching element which is connected in series with the inductor across the rectifier and which is driven to alternately turn on and off so as to store into the inductor an energy from the rectified DC voltage when the switching element is turned on and to release the energy from the inductor through a blocking diode to a charge-pump circuit when the switching element is turned off. The charge-pump circuit is connected to receive the energy released from the inductor as well as from the rectifier to accumulate a first voltage and provides a divided voltage of the first voltage to charge a smoothing capacitor by the divided voltage so as to develop thereat the step-down output DC voltage for driving a load. The converter further includes a switch which is turned on during at least a portion of an ON-period of the switching element in order to connect the smoothing capacitor to the charge-pump circuit for charging the smoothing capacitor by the divided voltage. The switch is turned off during an OFF-period of the switching element in order to disconnect the smoothing capacitor from the chopper. In this manner, the step-up chopper acts to transmit the energy directly from the rectifier to the charge-pump circuit to give the first DC voltage thereat, while the charge-pump circuit acts to convert the first DC voltage to the step-down DC voltage to the smoothing capacitor as the step-down output DC voltage to be supplied to the load. With the inclusion of the switch, the smoothing capacitor is disconnected from the chopper so that it is kept free from the high voltage from the step-up chopper and is charged only from the charge-pump circuit to accumulate the step-down output DC voltage. Therefore, only one smoothing capacitor of low capacitance is enough in the circuit, while utilizing the step-up chopper. With the use of the step-up chopper connected to the rectifier for storing the energy to the charge-pump circuit, it is possible to maximize the power factor with reduced high frequency harmonics in an input current to the rectifier. Further, the use of the charge-pump circuit minimizes energy loss in the conversion of the DC voltage from the charge-pump circuit to the smoothing capacitor, which improves circuit efficiency in providing the step-down output DC voltage from the rectifier.

Accordingly, it is a primary object of the present invention to provide an AC-to-DC converter which is capable of maximizing the power factor with superior circuit efficiency.

The switch may comprise an auxiliary switching element which is connected in series with the smoothing capacitor and is controlled by a controller common to the switching element of the chopper so that the two switching elements are controlled turn on and off in synchronism with each other.

Alternately, the switch may comprise the switching element of the chopper and a diode which is connected in series with the smoothing capacitor across the blocking diode with the two diodes being in antiparallel relation with regard to their polarity. Thus, the charge-pump circuit can be connected and disconnected to and from the smoothing capacitor only by the addition of the diode while sharing the switching element of the chopper, which reduces the number of components.

These and still other objects and advantageous features of the present invention will become more apparent from the following description of the preferred embodiments when taken in conjunction with the attached drawings.

BRIEF DESCRIPTION OF THE DRAWINGS

FIG. 4 is a circuit diagram of a controller utilized in the circuit of FIG. 3;

FIGS. 5A to 5E are waveform charts illustrating the operation of the circuit of FIG. 3;

DETAILED DESCRIPTION OF THE PREFERRED EMBODIMENTS

Figure 1:
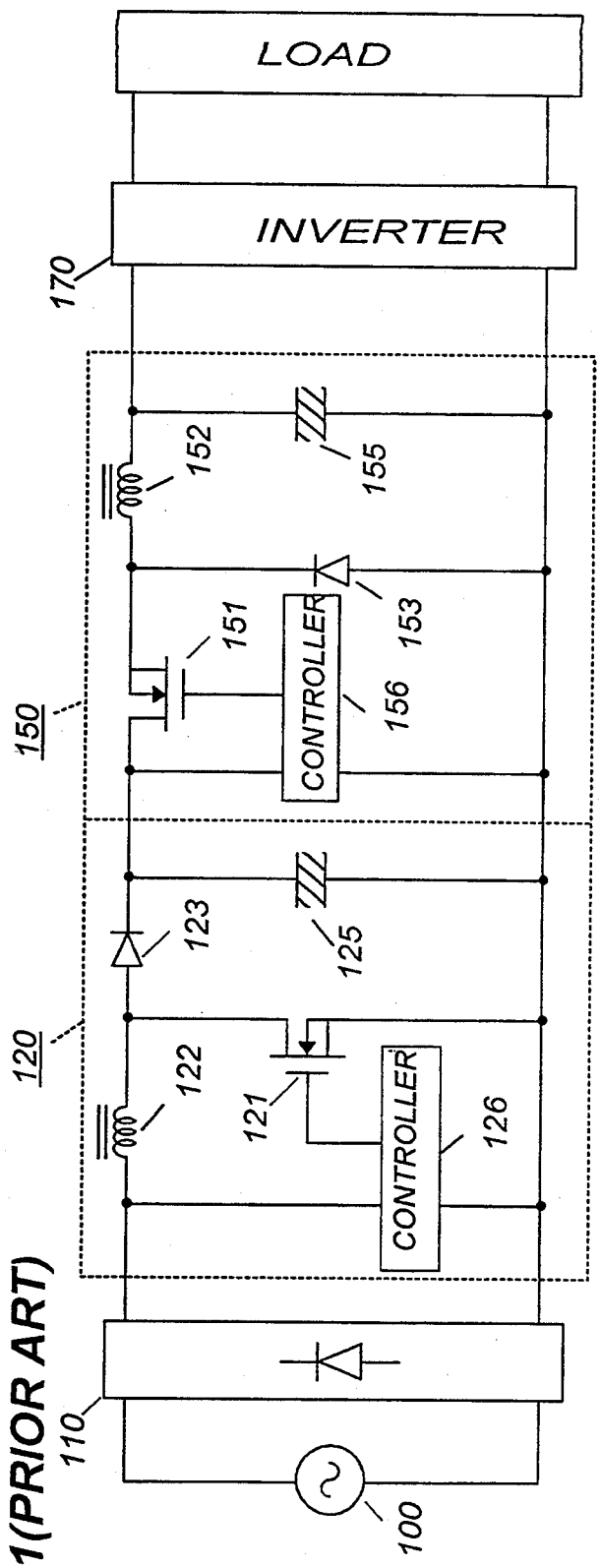
FIGS. 1 and 2 are circuit diagrams of prior AC-to-DC converters, respectively.
Figure 2:
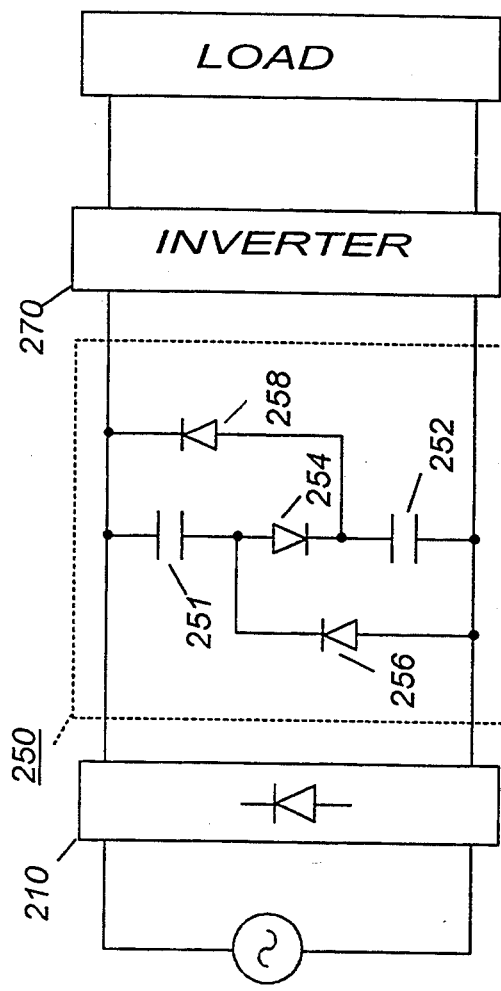
Figure 3:
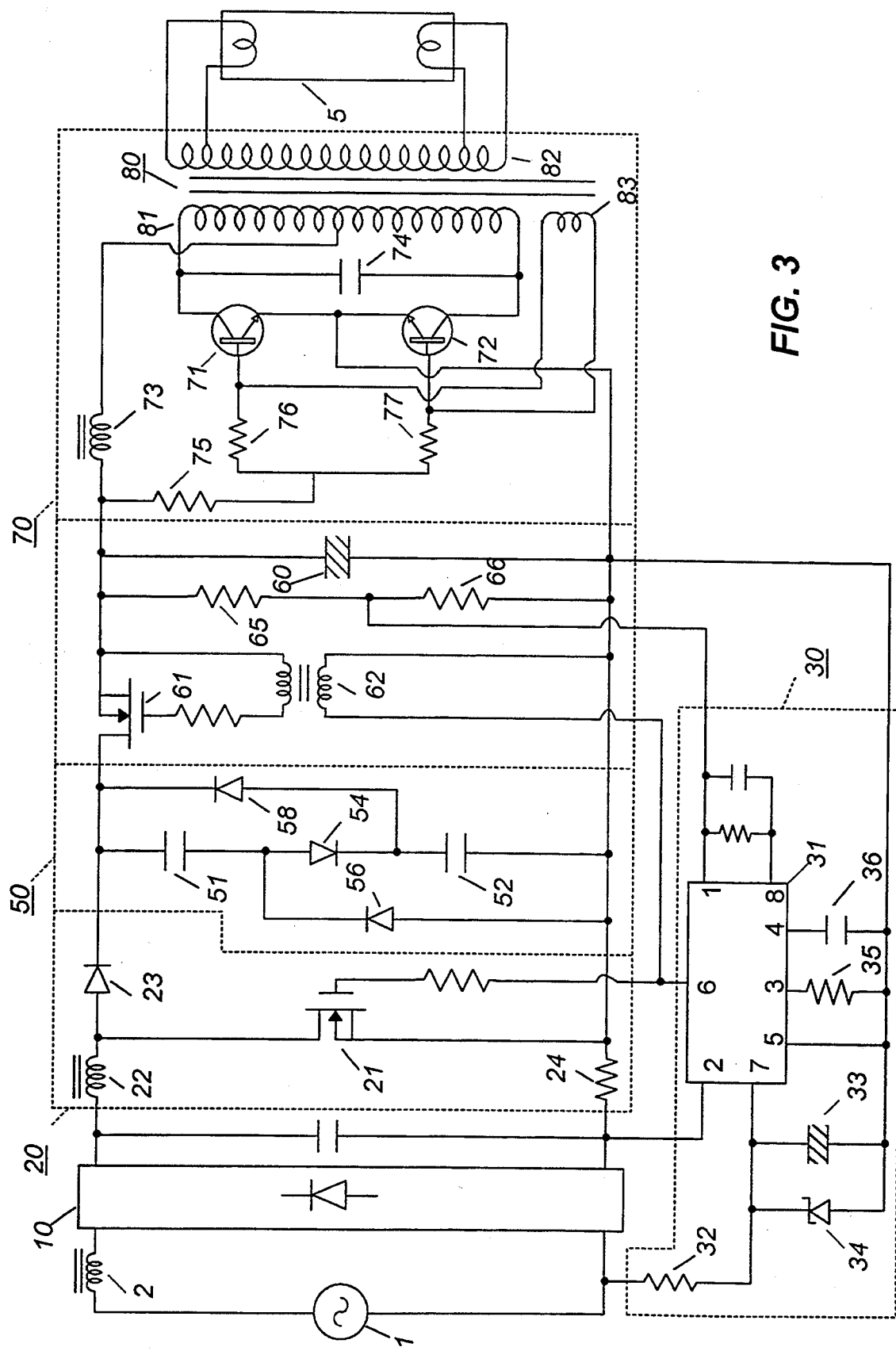
FIG. 3 is a circuit diagram of an AC-to-DC converter in accordance with a first embodiment of the present invention.

First Embodiment <FIGS. 3 and 4>

Referring now to FIG. 3, there is shown an AC-to-DC converter in accordance with a first embodiment of the present invention. The converter is adapted in use to supply a step-down DC voltage from an AC voltage source 1 to an inverter 70 which in turn drives a discharge lamp 5. The converter comprises a full-wave rectifier 10 in the form of a diode bridge which is connected through a choke coil 2 to the AC voltage source 1 for providing a rectified DC voltage. Connected to the rectifier 10 is a step-up chopper 20 which produces a step-up voltage from the rectified DC voltage. The step-up chopper 20 comprises an FET 21 which is connected in series with an inductor 22 and a current sensing resistor 24 across the rectifier 10 and is controlled by a controller 30 to turn on and off at a high frequency such that the inductor 22 stores an energy from the rectified DC voltage from the rectifier 10 when the FET 21 is conductive and releases the energy through a blocking diode 23 when FET 21 is kept turned off. The energy released from the inductor 22 is added to the rectified DC output supplied also through the diode 23 from the rectifier 10 to provide the step-up voltage which is applied to a charge-pump circuit 50.

The charge-pump circuit 50 comprises a pair of capacitors 51 and 52 which are connected in series with the diode 23 across FET 21 of the chopper 20 so that the step-up voltage from the chopper 20 is applied through diode 23 to the series combination of capacitors 51 and 52. Thus, the individual capacitors 51 and 52 are charged to develop a divided half voltage of the step-up voltage, respectively. A diode network composed of diodes 54, 56, 58 is connected to capacitors 51 and 52 to provide two parallel paths for discharging the individual capacitors 51 and 52 to a smoothing capacitor 60, thereby developing a step-down output DC voltage thereacross which is a half of the voltage applied to the charge-pump circuit 50. That is, diode 56 is connected in series with the first capacitor 51 and in parallel with the series combination of diode 54 and the second capacitor 52 to constitute the one of the parallel paths for discharging the first capacitor 51 to charge the smoothing capacitor 60, while diode 58 is connected in series with the second capacitor 52 and in parallel with the series combination of diode 54 and the first capacitor 51 to constitute the other path for discharging the second capacitor 52 to charge the smoothing capacitor 60.

An FET 61 is connected in series with the smoothing capacitor 60 across the charge-pump circuit 50 so as to connect and disconnect the parallel paths to and from the smoothing capacitor 60. FET 61 is controlled commonly by the controller 30 to turn on and off in synchronism with FET 21 of the chopper 20. To this end, FET 61 has its gate connected through a transformer 62 to the controller 30. When FET 61 is conductive in which FET 41 is also conductive to store the energy in the inductor 22, the charge-pump circuit 50 is connected to the smoothing capacitor 60 for charging the smoothing capacitor 60 through the parallel paths from the individual capacitors 51 and 52. When, on the other hand, FET 61 is nonconductive, the smoothing capacitor 60 is disconnected from the charge-pump circuit 50 to receive no voltage from the charge-pump circuit 50 as well as from the chopper 20, at which condition, FET 21 is also non-conductive to release the energy from the inductor 22 to charge the series connected pair of capacitors 51 and 52 in addition to the rectified DC output from the rectifier 10. A voltage divider of resistors 65 and 66 is connected in parallel with the smoothing capacitor 60 to give to the controller 30 a divided voltage indicative of the step-down output DC voltage at the smoothing capacitor 60.

The controller 30 comprises an application specific IC 31 known as "UC3852" available from Unitrode Inc and associated components to control FETs 21 and 61 while monitoring a current flowing through resistor 24 of the chopper 20 as well as monitoring the output DC voltage at the smoothing capacitor 60. The IC 31 has an input terminal (pin no. 7) which is connected to the AC voltage source 1 through a resistor 32, capacitor 33, and a zener diode 34. When capacitor 33 is charged to give an operating voltage to the input terminal (pin no. 7), the IC 31 is made active to produce a starting pulse at a control terminal (pin no. 6) for turning on FETs 21 and 61. The divided voltage from the voltage divider of resistors 65 and 66 is fed to a feedback terminal (pin no. 1). As shown in FIG. 4, the IC 31 includes a differential amplifier 40 which outputs an error voltage in correspondence to a difference between two inputs, one being the divided voltage received at the feedback terminal (pin no. 1) and the other being an internal reference voltage determined at a voltage generator 41. An internal current source 42 provided in the IC 31 is connected to an external resistor 35 through a terminal (pin no. 3) to give a charge current for charging an external capacitor 36 connected to a terminal (pin no. 4). The voltage of capacitor 36 is compared at a comparator 43 with the error voltage from the amplifier 40 to provide a high level output when the voltage from capacitor 36 exceeds the error voltage. The high level output is fed through an OR gate 44 to a reset input R of a RS flip-flop 45 which in turn provides a low level signal at Q output and a high level signal at $\overline{Q}$ output. The low level signal from Q output is fed through a buffer 46 and through the control terminal (pin no. 6) to turn off FETs 21 and 61, at which occurrence, the high level signal from $\overline{Q}$ output give a bias to turn on a transistor 47, thereby discharging capacitor 36 to make it ready for subsequent charging thereof. Thus, ON-period of FETs 21 and 61 is determined by the voltage accumulated at the smoothing capacitor 60 and a time constant of resistor 35 and capacitor 36. The current flowing through the inductor 22 of the chopper is sensed by a voltage developed across the current sensing resistor 24. The resulting voltage is fed through a terminal (pin no. 2) to a zero-point detector 48 and to a maximum current detector 49. When the current flowing through the inductor 22 decreases to zero after FET 21 is turned off, the zero-point detector 48 responds to provide a high level signal to a set input S of the flip-flop 45, thereby turning on the FETS 21 and 61. At this occurrence, transistor 47 is turned off to charge the capacitor 36 until it is charged up to a level at which comparator 43 provides the output for resetting the flip-flop 45. In this manner, the above operations are repeated to turn on and off the FETs 21 and 61 without leaving a dead time in which no current flows through the inductor 22. The maximum current detector 49 acts to reset the flip-flop 45 in case when an unduly high current flows through the inductor 22 for protection of the circuit.

Thus configured controller 30 gives a pulse train as shown in FIG. 5A which is fed to FET 21 of the chopper 20 to turn on and off, thereby flowing the current of a triangular waveform through the inductor 22, as shown in FIG. 5B. With this consequence, the charge-pump circuit 50 receives across the series combination of capacitors 51 and 52 a voltage of rectangular waveform, as shown in FIG. 5C, which is composed of a high level voltage developed during the OFF-period of FET 21 and a low level voltage developed during the ON-period of FET 21. The low voltage is approximately a half of the high voltage. As described before, when FET 61 is conductive in synchronism with FET 21, the charge-pump circuit 50 is allowed to flow the current from the individual capacitors 51 and 52 respectively through the diodes 54 and 55 and commonly through FET 61, as shown in FIG. 5D, thereby charging the smoothing capacitor 60. While, on the other hand, the current is not allowed to flow from the capacitors 51 and 52 to the smoothing capacitor 60 when FET 61 is non-conductive. With this result, the smoothing capacitor 60 is charged to develop the step-down DC voltage of substantially constant level, as shown in FIG. 5E.

Although, in this embodiment, FET 61 is controlled commonly by the controller 30 to turn on and off in synchronism with FET 21, FET 61 may be controlled separately. In this connection, FET 61 may be controlled to 10 be conductive during at least a portion of the ON-period of FET 21 to charge the smoothing capacitor 60 to develop thereacross a further step-down DC voltage. However, it is necessary to turn off FET 61 over the entire OFF-period of FET 21 in order to isolate the smoothing capacitor 60 from the chopper 20 to avoid the smoothing capacitor 60 from being charged directly from the chopper 20.

The resulting constant DC voltage developed at the smoothing capacitor 60 is applied to operate the inverter 70 for lighting the discharge lamp at a high frequency. The inverter 70 is of a center-tap type which comprises a pair of transistors 71 and 72 and an output transformer 80 with a primary winding 81, a secondary winding 82 coupled to the discharge lamp 5, and a feedback winding 83. Transistors 71 and 72 have their emitter commonly coupled with their collectors connected respectively to the opposite ends of the primary winding 81. The primary winding 81 has a center tap CT which is connected through an inductor 73 to one end of the smoothing capacitor 60. The other end of the smoothing capacitor 60 is connected to the commonly coupled emitters of transistors 71 and 72. A capacitor 74 is connected across the primary winding 81. The feedback winding 83 is connected to apply a bias to alternately turn on and off transistors 71 and 72 in a self-excited manner, thereby producing a high frequency AC voltage across the primary winding 81 and therefore applying the corresponding AC voltage through the secondary winding 82 to light the discharge lamp 5. Resistors 75 to 77 are provided to start the inverter 70.

Figure 6:
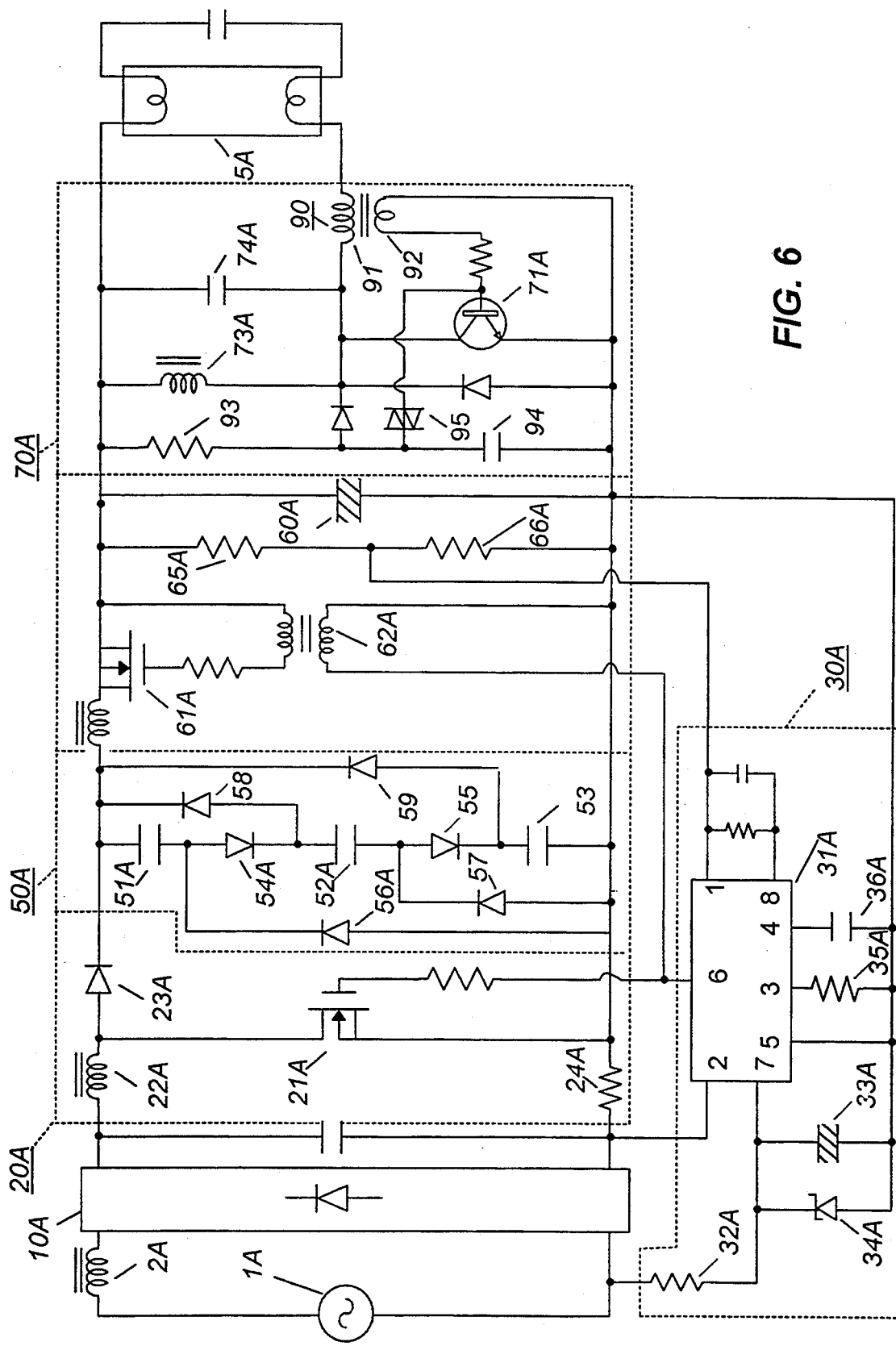
FIG. 6 is a circuit diagram of an AC-to-DC converter in accordance with a modification of the first embodiment.

FIG. 6 illustrates a modification of the first embodiment which is similar to the first embodiment except that a charge-pump circuit 50A is configured to provide a further step-down voltage to a like smoothing capacitor 60A. Like components are designated by like numerals with a suffix letter of "A". Therefore, no duplicate description of the like components are made herein for the sake of simplicity. The charge-pump circuit 50A comprises three capacitors 51A, 52A and 53 which are connected in series with diodes 54A, 55 and with blocking diode 23A across the FET 21A with the diode 54A inserted between the first and second capacitors 51A and 52A and with the diode 55 inserted between the second and third capacitors 52A and 53. A diode network of diodes 56A, 57, 58A, and 59 in addition to the diodes 54A, 55 is cooperative with the capacitors 51A, 52A, and 53 to provide three parallel paths for connecting the individual capacitors to the smoothing capacitor 60A, thereby accumulating into the smoothing capacitor 60A the correspondingly step-down DC voltage which is approximately one third of the voltage supplied from the chopper 20A to the charge-pump circuit 50A. It should be noted in this connection that the charge-pump circuit may include a suitable number (n) of capacitors with associated diodes to provide to the smoothing capacitor a step-down output DC voltage which is one n-th (where $n \geq 2$) of the voltage supplied from the chopper.

The inverter 70A shown as connected to the AC-to-DC converter of this modification comprises a single transistor 71A, an L-C resonant circuit composed of an inductor 73A and a capacitor 74A, and a feedback transformer 90 with a primary winding 91 and a feedback winding 92. The transistor 71A is connected in series with the L-C resonant circuit across the smoothing capacitor 60A. The discharge lamp 5A is connected across the resonant circuit with the primary winding 91 inserted between one end of the lamp 5A and the capacitor 74A. The feedback winding 92 is connected to a base of the transistor 71A in order to turn on and off the transistor 71A in a self-excited manner, whereby the resonant circuit responds to produce an oscillating voltage for lightening the discharge lamp 5A. A starter circuit of a resistor 93 and a capacitor 94 is connected across the smoothing capacitor 60A to give a starting bias through a diac 95 to the base of transistor 71A.

Figure 7:
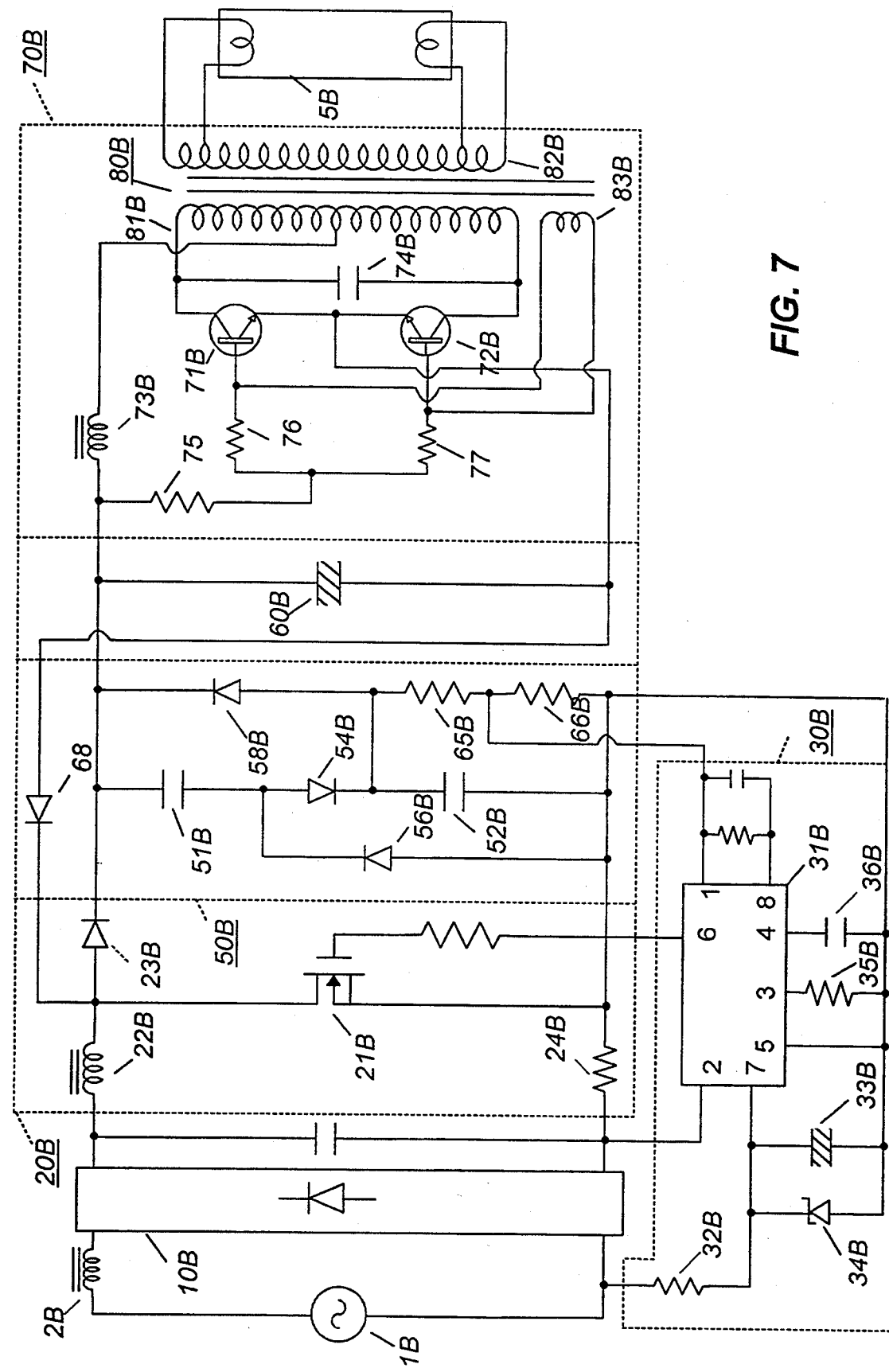
FIG. 7 is a circuit diagram of an AC-to-DC converter in accordance with a second embodiment of the present invention.

Second Embodiment <FIG. 7>

Figure 8A:
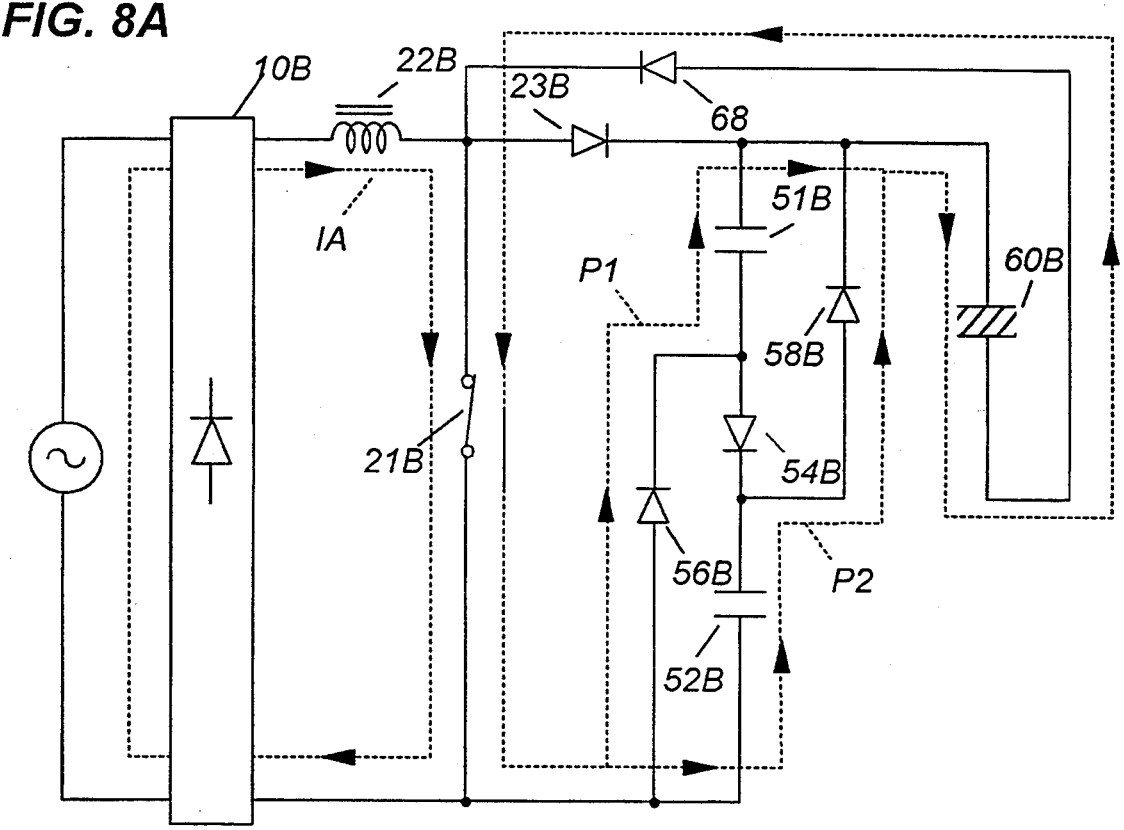
FIGS. 8A and 8B are diagrams illustrating the operation of the circuit of FIG. 7.

Referring to FIG. 7, there is shown an AC-to-DC converter in accordance with a second embodiment of the present invention which is similar to the first embodiment but includes a unique switch for connecting and disconnecting a like charge-pump circuit 50B to and from the smoothing capacitor 60A, instead of utilizing the second FET 61. Like components are designated by like numerals with a suffix letter of "B". The switch shares the FET 21B of the chopper 20B and includes an additional diode 68 which is connected in series with the smoothing capacitor 60B across the blocking diode 23B. The diode 68 is connected with its polarity opposite to that of the blocking diode 23B so as to establish two parallel paths for discharging the individual capacitors 51B and 52B of the charge-pump circuit 50B to the smoothing capacitor 60B commonly through the diode 68 and the FET 21B. That is, as shown in FIG. 8A, when FET 21B is conductive to flow the current $I_A$ from the rectifier 10B through the inductor 22B, the charge-pump circuit 50B is enabled to discharge the individual capacitors 51B and 52B respectively through the first loop path $P_1$ of diode 56B, the first capacitor 51B, smoothing capacitor 60B, diode 68, and FET 21B and through the second loop path $P_2$ of the second capacitor 52B, diode 58B, smoothing capacitor 60B, diode 68, and FET 21B, thereby accumulating the step-down voltage to the smoothing capacitor 60B which is approximately a half of the voltage supplied from the chopper 20B. At this condition, the smoothing capacitor 60B is isolated from the chopper 20B so as not to be charged by the voltage from the chopper 20B.

Figure 8B:
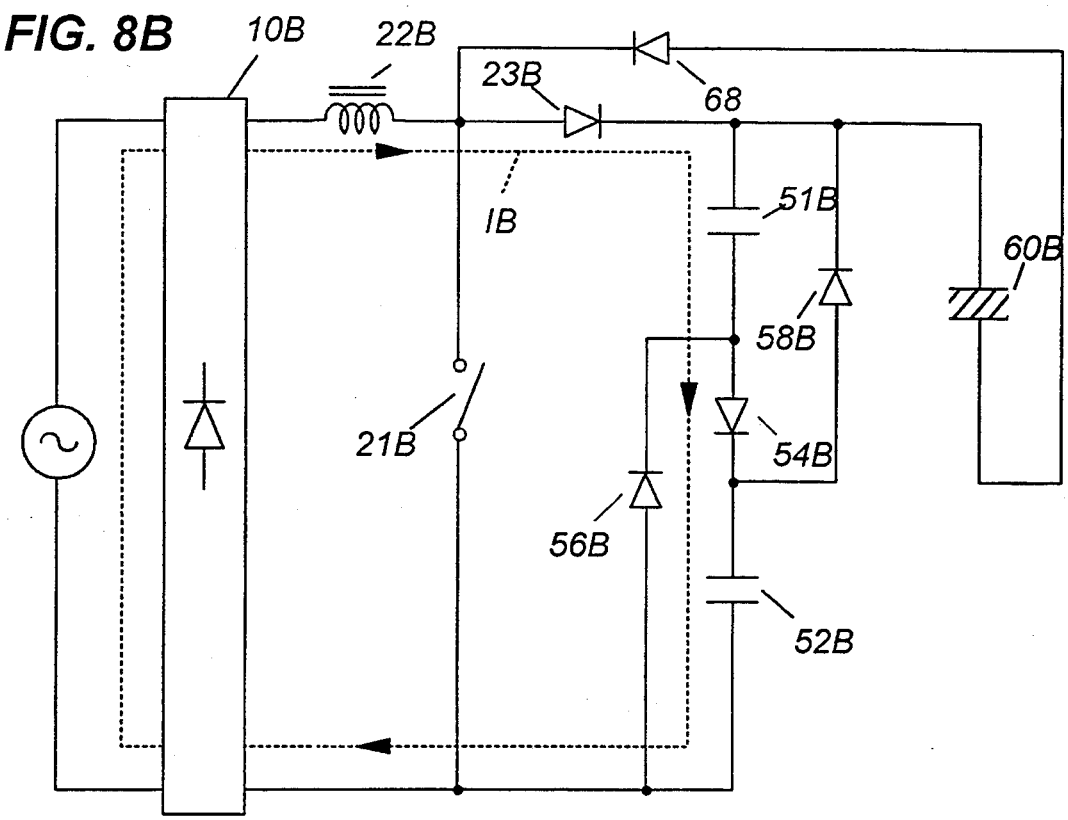

When the FET 21B is turned off, as shown in FIG. 8B, the inductor 22B releases the energy which is additive to the rectified DC voltage from the rectifier 10B to flow the corresponding current $I_B$ through the series combination of capacitors 51B and 52B, thereby charging the individual capacitors. At this condition, the FET 21B disconnects the smoothing capacitor 60B from the charge-pump circuit 50B, thereby disabling the smoothing capacitor 60B from being charged from the chopper 20B. Accordingly, the converter of this embodiment has the same function of the first embodiment only by an addition of the diode 68 and without requiring an additional FET or switching element. In this embodiment, a voltage divider of resistors 65B and 66B is connected across the second capacitor 52B rather than the smoothing capacitor as seen in the first embodiment so as to give a monitored voltage to the controller 30B as indicative of the output DC voltage. It is equally possible also to modify this embodiment to utilize a suitable number of capacitors in the charge-pump circuit to give a further step-down output DC voltage to the inverter 70B or the like load circuit.

| LIST OF REFERENCE NUMERALS | |
|---|---|
| 1 AC voltage source | 70 inverter |
| 2 choke coil | 71 transistor |
| 5 discharge lamp | 72 transistor |
| 10 rectifier | 73 inductor |
| 20 step-up chopper | 74 capacitor |
| 21 FET | 75 resistor |
| 22 inductor | 76 resistor |
| 23 blocking diode | 77 resistor |
| 24 current sensing resistor | 80 output transformer |
| | 81 primary winding |
| 30 controller | 82 secondary winding |
| 31 IC | 83 feedback winding |
| 32 resistor | 90 feedback transformer |
| 33 capacitor | 91 primary winding |
| 34 zener diode | 92 feedback winding |
| 35 resistor | 93 resistor |
| 36 capacitor | 94 capacitor |
| 40 differential amplifier | 95 diac |
| 41 voltage generator | 100 AC voltage source |
| 42 current source | 110 rectifier |
| 43 comparator | 120 step-up chopper |
| 44 OR gate | 121 FET |
| 45 flip-flop | 122 inductor |
| 46 buffer | 123 blocking diode |
| 47 transistor | 125 smoothing capacitor |
| 48 zero-point detector | 126 controller |
| 49 maximum current detector | 150 inverted chopper |
| | 151 FET |
| 50 charge-pump circuit | 152 inductor |
| 51 capacitor | 153 blocking diode |
| 52 capacitor | 155 smoothing capacitor |
| 53 capacitor | 156 controller |
| 54 diode | 170 inverter |
| 55 diode | 210 rectifier |
| 56 diode | 250 charge-pump circuit |
| 57 diode | 251 capacitor |
| 58 diode | 252 capacitor |
| 59 diode | 254 diode |
| 60 smoothing capacitor | 256 diode |
| 61 FET | 258 diode |
| 62 transformer | |
| 65 resistor | |
| 66 resistor | |
| 68 diode | |

What is claimed is:

1. An AC-to-DC converter for providing a step-down output DC voltage which comprises:
   an AC voltage source;
   a rectifier connected to said AC voltage source to provide therefrom a rectified DC voltage;

a step-up chopper including an inductor which is connected in series with a first switching element across said rectifier, said first switching element driven to alternately turn on and off so as to store into said inductor an energy from said rectified DC voltage when said first switching element is on and to release the energy from said inductor when said first switching element is turned off, said chopper including a blocking diode through which said energy is released from said inductor;

a charge-pump circuit which is connected to receive said energy released from said inductor as well as from said rectifier through said blocking diode to accumulate a first voltage and provides a divided voltage of said first voltage to charge a smoothing capacitor by said divided voltage so as to develop thereat said step-down output DC voltage for driving a load; and switch means which is turned on during at least a portion of an ON-period of said first switching element in order to connect said smoothing capacitor to said charge-pump circuit for charging said smoothing capacitor by said divided voltage from said charge-pump circuit and which is turned off during an OFF-period of said first switching element in order to disconnect said smoothing capacitor from said chopper.

2. An AC-to-DC converter as set forth in claim 1, wherein said switch means comprises a second switching element connected in series with said smoothing capacitor.

3. An AC-to-DC converter as set forth in claim 2, wherein said first and second switching elements are controlled by a common controller to turn on and off in synchronism with each other.

4. An AC-to-DC converter as set forth in claim 1, wherein said switching means comprises said switching element of said chopper and a diode which is connected in series with said smoothing capacitor across said blocking diode with said diodes being in antiparallel relation with regard to their polarity.

5. An AC-to-DC converter as set forth in claim 1, wherein said charge-pump circuit comprises:

a plurality of capacitors connected in series with said blocking diode across said first switching element so that said capacitors are charged by the energy released through said blocking diode from said inductor as well as from said rectifier to accumulate said first voltage across the series circuit of said capacitors with said individual capacitors charged to have said divided voltage; and a diode network connected to said capacitors for establishing parallel paths through which the individual capacitors are connected to said smoothing capacitors in parallel relations so that said smoothing capacitor is charged by said divided voltage.

* * * * *